July 14, 1931. O. S. BROWN 1,814,617
ENGINE STARTING AND LIGHTING SYSTEM
Filed March 20, 1930
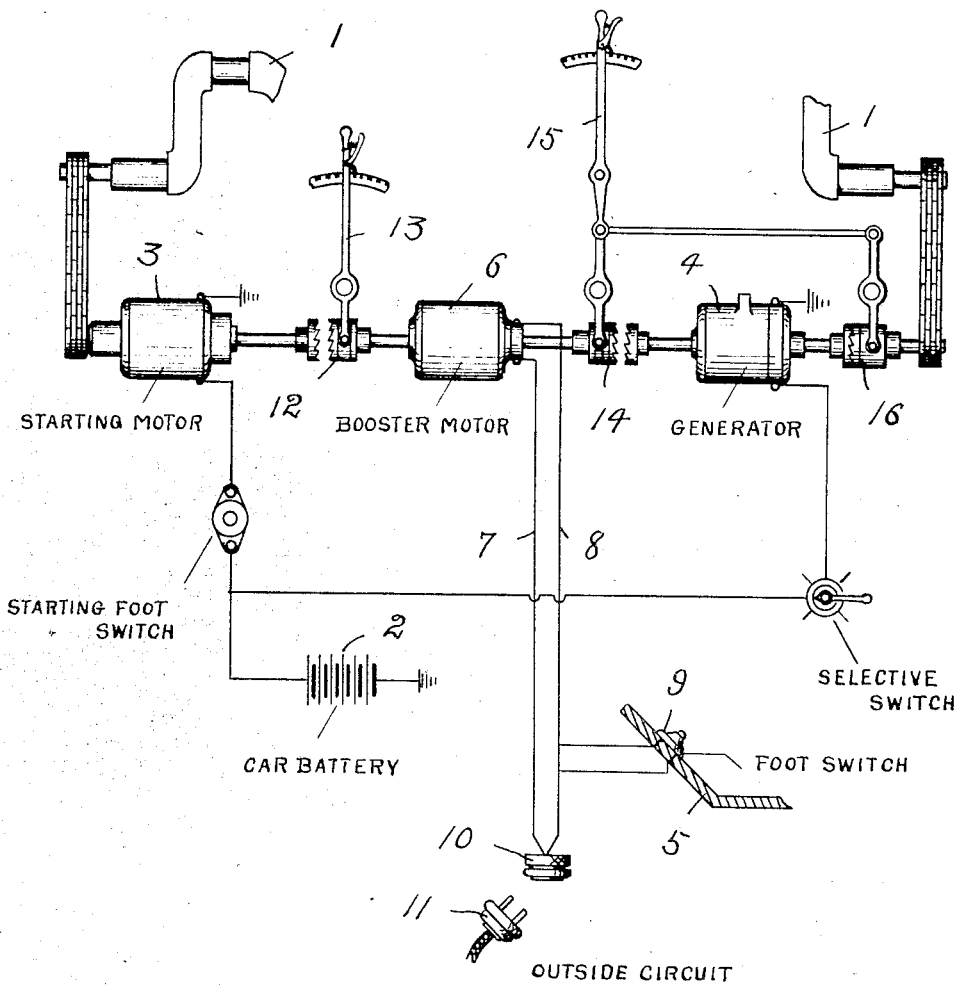

Patented July 14, 1931

1,814,617

UNITED STATES PATENT OFFICE

ORA S. BROWN, OF VIRGINIA, MINNESOTA

ENGINE STARTING AND LIGHTING SYSTEM

Application filed March 20, 1930. Serial No. 437,451.

This invention relates to electric starting and lighting systems for automobiles, and has special reference to the installation of a cooperative auxiliary or booster motor, the principal object being to provide simple means whereby to augment the efficiency of the starting and lighting system of an automobile.

Another object is to provide means for assisting the starting motor of an automobile when the engine is exceptionally cold, thus relieving abnormal strain upon the battery.

A further object is to provide such means whereby the battery may be charged independently of the operation of the automobile engine.

Other objects and advantages of the invention will appear in the following description thereof.

Referring now to the accompanying drawing, forming part of this application, and wherein like reference characters indicate like parts:

The illustration is a diagrammatic view of a portion of the wiring system of an automobile in which the engine is embodied.

1 represents the crank shaft of the automobile engine, 2 the storage battery as commonly found in such vehicles, 3 the starting motor, 4 the generator, and 5 indicates the foot board of the automobile. 6 represents the booster motor which I have shown as and preferably is installed in direct alignment with the starting motor and generator and intermediate of same. This motor is equipped with an electric circuit indicated by the wires 7 and 8, one of which leads to the foot switch 9 installed in the foot board 5 and they both eventually to the plug 10 installed in any convenient position in the automobile where an outside circuit, for example the lighting circuit of a garage, may be plugged into same as illustrated at 11. When this is done it is obvious that the foot switch 9 affords convenient selective means whereby to start or stop the booster motor 6, and of course this switch may be displaced by some more convenient form of hand switch if desired.

Intermediate of the booster motor and starting motor is illustrated a clutch 12 which may be of the conventional jaw, friction, or sleeve type as desired, operable by a suitable lever 13 so that when desired, for example on a cold morning in an unheated garage, assistance may be afforded the starting motor by throwing the clutch into action between the booster motor and starting motor and then applying the electric energy to the booster motor which will as before stated materially relieve the strain on the battery of the car. Of course when the car leaves the garage the connection 10 and 11 is broken.

A clutch 14 is installed intermediate of the booster motor and generator, the same being selectively controlled by the lever 15 which is also connected to a similar clutch 16 intermediate of the generator and its connection 17 to the automobile engine, so that when the clutch 14 is thrown into action uniting the booster motor and generator the connection of the latter to the engine will automatically be broken to insure against strain coming on the generator when the automobile engine is inactive, and at which time if power is applied to the booster motor it will proceed to operate the generator and recharge or augment the charging of the battery.

From the foregoing, it is evident that I have devised an exceedingly simple means necessitating but little more than the extra motor in an automobile whereby to materially improve the functioning of the entire starting and lighting system.

Having thus described my invention, what I claim and desire to secure by Letters Patent, is:

1. In a starting and lighting system for vehicles, a starting motor, a generator, a storage battery, a booster motor having an operating electric circuit apart from the vehicle, and selective means whereby to operate either the starting motor or the generator by the booster motor.

2. The combination with a vehicle starting and lighting system including a starting motor, a generator and a storage battery, of a booster motor having a circuit for operating same apart from the vehicle, and means whereby the booster motor may operate the generator or the starter motor.

In testimony whereof I affix my signature.

ORA S. BROWN.